United States Patent
Pendlebury et al.

(10) Patent No.: US 6,493,760 B1
(45) Date of Patent: Dec. 10, 2002

(54) STANDALONE DEVICE FOR IDENTIFYING AVAILABLE DOCUMENT SERVICES IN A TOKEN-ENABLED OPERATING ENVIRONMENT

(75) Inventors: David L. Pendlebury, Wigan Lancs; Michael G. Lamming, Cambridge; Margery A. Eldridge, Cambridge; Christopher M. Jones, Cambridge; Mark Stringer, Huddersfield, all of (GB)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/340,749

(22) Filed: Jun. 28, 1999

(51) Int. Cl.[7] .................................. G06F 15/16
(52) U.S. Cl. .................. 709/229; 709/217; 709/218; 709/219; 709/225; 713/171; 713/182
(58) Field of Search .................. 709/217, 218, 709/219, 200, 206, 225, 229; 358/400; 713/171, 182

(56) References Cited

U.S. PATENT DOCUMENTS

| | | | | |
|---|---|---|---|---|
| 5,555,376 A | | 9/1996 | Theimer et al. | 709/200 |
| 5,862,321 A | | 1/1999 | Lamming et al. | 709/229 |
| 6,144,997 A | * | 11/2000 | Lamming et al. | 709/217 |
| 6,147,773 A | * | 11/2000 | Taylor et al. | 358/400 |
| 6,397,261 B1 | * | 5/2002 | Eldridge et al. | 709/229 |

OTHER PUBLICATIONS

Comparing two approaches to remote mailbox access: IMAP vs. POP, Terry Gray, May 11, 1993.*
Schilit, Bill et al., "Context–Aware Computing Applications", published in *Proceedings Workshop on Mobile Computing Systems and Applications*, IEEE, Dec. 1994, and in Technical Report CSL–94–12, Xerox Palo Alto Research Center, Nov. 1994.
Want, Roy et al. "The Active Badge Location System," ACM Transactions on Information Systems, vol. 10, No. 1, Jan. 1992, pp. 91–102.
Want, Roy et al. "Active Badges and Personal Interactive Computing Objects," IEEE Transactions on Consumer Electronics, vol. 38, No. 1, Feb. 1992, pp. 10–20.
Want, Roy et al., "The PARCTAB Ubiquitous Computing Experiment," published in Technical Report CSL–95–1, Xerox Palo Alto Research Center, Mar. 1995 and in IEEE Personal Communications, Dec. 1995.

(List continued on next page.)

*Assistant Examiner*—Chuong Ho

(57) ABSTRACT

Non token-enabled devices are token-enabled using a token-enabler unit for operation in a distributed environment with mobile computing devices that reference documents using tokens. The mobile computing device is used to configure the token-enabler unit with identifying information of the non token-enabled device. The token-enabler unit, which is not operatively coupled to the non token-enabled device, is either fixedly attached or proximately located near the non token-enabled devices. In operation, mobile computing devices query the token-enabler unit for identifying information of the non token-enabled device, thereby seamlessly integrating the operation of non token-enabled devices with token-enabled devices.

20 Claims, 9 Drawing Sheets

OTHER PUBLICATIONS

U.S. patent application Ser. No. 09/118,221 entitled "Token–Based Document Transaction Systems" to Margery A. Eldridge et al., filed Jul. 17, 1998.

U.S. patent application Ser. No. 09/118,322 entitled "Token–Based Document Transactions" to Margery A. Eldridge et al., filed on Jul. 17, 1998.

U.S. patent application Ser. No. 09/118,598 entitled "Context–Sensitive Document Transactions" to Margery A. Eldridge et al., filed Jul. 17, 1998.

U.S. patent application Ser. No. 09/270,641 entitled "System For Generating Context–Sensitive Hierarchically Ordered Document Service Menus" to Margery A. Eldridge et al., filed on Mar. 16, 1999.

U.S. patent application Ser. No. 09/270,320 entitled "Secure Token–Based Document Server" to Margery A. Eldridge et al., filed on Mar. 16, 1999.

U.S. patent application Ser. No. 09/270,451 entitled "Mobile Email Document Transaction Service" to Margery A. Eldridge et al., filed on Mar. 16, 1999.

U.S. patent application Ser. No. 09/270,645 entitled "Mobile Document Paging Service" to Margery A. Eldridge et al., filed on Mar. 16, 1999.

* cited by examiner

*Primary Examiner*—Dung C. Dinh

FIG. 8
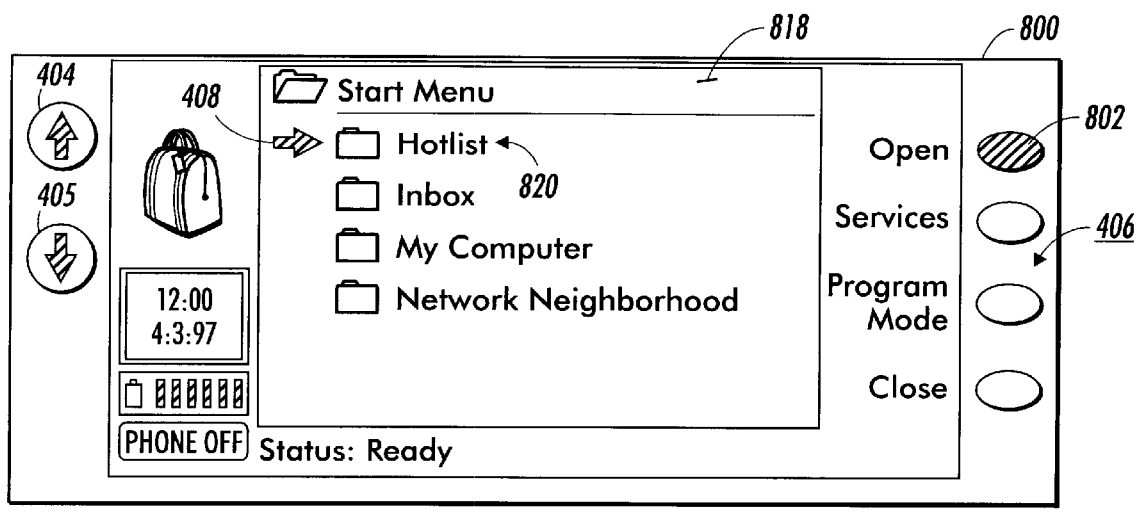
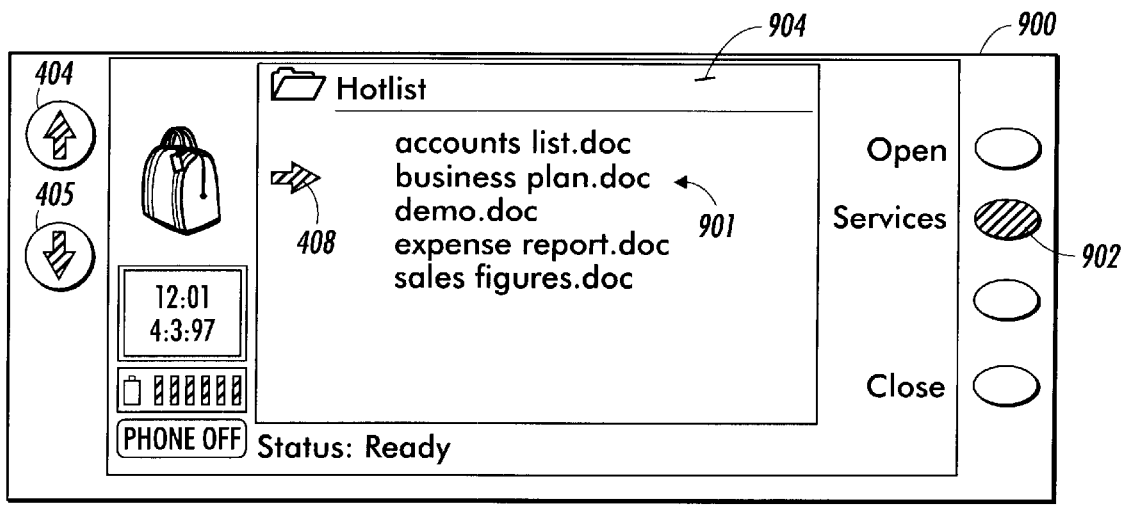
FIG. 9

STANDALONE DEVICE FOR IDENTIFYING AVAILABLE DOCUMENT SERVICES IN A TOKEN-ENABLED OPERATING ENVIRONMENT

BACKGROUND OF THE INVENTION

1. Field of the Invention

The present invention relates generally to a token-enabled document services system, and more particularly to, a standalone device for identifying document services of non token-enabled devices to token-enabled mobile computing devices.

2. Description of Related Art

While the use of mobile computing devices is becoming more prevalent among mobile workers, transfer of document information between mobile computing devices is often limited due to inadequate storage capacity on such devices or due to inadequate communication channel bandwidth. To overcome these limitations, many mobile workers carry a laptop computer with them while traveling. Although laptop computers are increasingly smaller and lighter, their functionality, which is designed to meet the requirements of office-based document work, is determined largely by the desktop machines from which they evolved. Powerful editors and spreadsheet applications, for example, that are essential in certain office-based work environments have limited utility while away from the office. In some circumstances, mobile workers carry laptop computers simply to be able to access their documents, and not necessarily to create or edit them.

A mobile document transaction service for overcoming these limitations is disclosed in U.S. Pat. No. 5,862,321, which is entitled "System and Method for Accessing and Distributing Electronic Documents." More specifically, U.S. Pat. No. 5,862,321 discloses a system for transferring between computers document identifiers that represent a particular document, rather than the document itself. This system can include any number of workstations, file servers, printers and other fixed devices (including multifunction devices) coupled to a network. In addition this system can include a number of mobile computing devices carried by users and coupled to the network by an infrared (IR) or radio (RF) link. Each mobile computing device appears to hold a users personal collection of documents, with the devices being programmed to receive, transmit, and store document identifiers (e.g., a URL—"Uniform Resource Locator") or document tokens, as defined herein.

Each document token is associated with an electronic document stored in an electronic repository or database. The mobile document transaction service effectively distributes references to documents between mobile computing devices by transmission of document tokens, rather than the documents themselves. For example, a document can be sent to a token-enabled (e.g., an IR transceiver equipped) network printer by "beaming" a document token, which references the document, from a handheld portable computer to the network printer. The token-enabled network printer retrieves the complete document referenced by the document token, and immediately prints a copy of the document. Thus, to a user of the mobile document transaction service, documents are seamlessly passed between users and output or input to token-enabled devices coupled to networks as expansive as the Internet.

In general for a device to be token-enabled, it must be equipped with hardware and software that will enable it to transmit, receive, and manage document tokens. Because many devices are not token-enabled, their services (e.g., printing, faxing, displaying, etc.) are not immediately available to a token-enabled mobile device. Even though many devices are not equipped to transmit, receive, and manage document tokens (i.e., non token-enabled devices), these devices are nonetheless indirectly accessible from a token-enabled mobile device using, for example, the telephone network or the Internet. Accordingly, it would be advantageous to provide a standalone device that token-enabled non token-enabled devices. Advantageously, such a standalone device would seamlessly integrate the operation of non token-enabled devices, such as a fax machines, printers, or computers with token-enabled mobile computing devices without modification and therefore independent of the non token-enabled devices.

SUMMARY OF THE INVENTION

In accordance with the invention, there is provided a distributed token-enabled operating environment in which document services are made accessible from a mobile computing device. The mobile computing device dynamically formulates and/or stores document tokens that reference electronic documents located on file servers (i.e., document repositories) coupled to a wire-based network. The mobile computing device includes a user interface for invoking document services to be performed on the electronic documents referenced by the document tokens. The document services are provided by token-enabled devices and non token-enabled devices. Unlike the token-enabled devices, which are equipped to transmit, receive and manage document tokens, the non token-enabled devices are not so equipped.

In accordance with one aspect of the invention, a token-enabler unit is attached to or located proximate to a non token-enabled device. The token-enabler unit is configured to respond to queries from mobile computing devices requesting the identification of document services available at the non token-enabled device to which it is attached or proximately located. The token-enabler unit responds to document service request from the mobile computing device by providing information for identifying document services offered by the non token-enabled device. Upon receipt of the identifying information, the mobile computing device through a token-enabled server invokes services available at the non token-enabled device to be performed on electronic documents referenced by selected document tokens.

BRIEF DESCRIPTION OF THE DRAWINGS

These and other aspects of the invention will become apparent from the following description read in conjunction with the accompanying drawings wherein the same reference numerals have been applied to like parts and in which:

FIGS. 8–10 illustrate a user interface that operates on the mobile computing devices for performing user-specified operations set forth in FIG. 7;

DETAILED DESCRIPTION

A. Operating Environment

Figure 1:
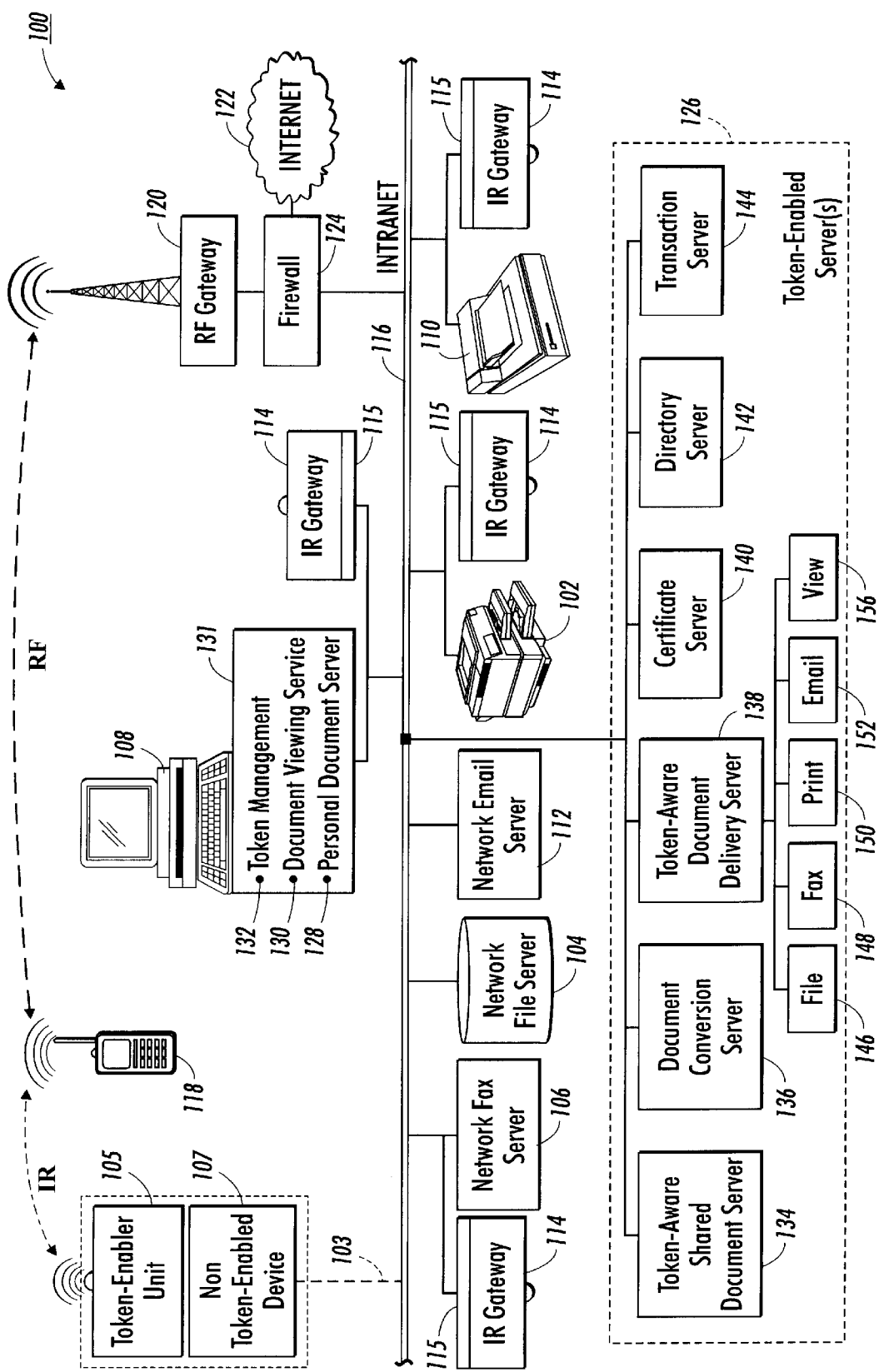
FIG. 1 illustrates a distributed operating environment with token-enabled and non token-enabled devices.

Referring now to the drawings where the showings are for the purpose of describing the invention, FIG. 1 illustrates a distributed token-enabled operating environment 100 for performing the present invention. The distributed token-enabled operating environment 100 includes a plurality of network devices for providing document services. The network devices, which are coupled to wire-based networks 116 and 122, include a printer 102, a file server 104, a network fax server 106, a personal workstation 108, a scanner 110, and a network email server 112. Generally, these as well as other network devices not shown, communicate using Intranet 116 and gain access to Internet 122 through firewall 124. The network devices communicate over the wire-based networks 116 and 122 using well-known network communication protocols such as TCP/IP.

In addition, FIG. 1 shows a token-enable mobile computing device 118 (hereinafter "mobile computing device"). The mobile computing device 118 is bridged to the wire-based networks 116 and 122 through either IR gateways 114 or RF gateway 120. The mobile computing device 118 communicates with other wire-based or wireless devices using either an IR (Infrared) transceiver or a radio (RF) transceiver integrated therein. An example of such a mobile computing device is the Nokia© 9000 Communicator, which is sold by the Nokia Company. The RF transceiver operates over any suitable wireless network such as PCS, GSM, or pager messaging. The IR transceiver uses, for example, communication standards set by the infrared data association (IrDA).

To seamlessly integrate document services across wireless and wire-based networks, the wire-based network is further populated with token-enabled server(s) 126, personal token-enabled workstation elements 131, and IR gateway context insertion slivers 115. These elements operate together in the distributed operating environment to provide users of the mobile computing device 118 with streamlined access to document services available on wire-based networks 116 and 122. A user of token-enabled mobile computing device 118 is capable of browsing through directories of document tokens. These document tokens represent the user's documents stored on wired-based networks 116 or 122. In addition using a token-enabled mobile computing device, the user is able to apply document services available on networks 116 or 122 to selected document tokens.

Token-enabled mobile computing devices are further described in the following patent and patent applications, which are hereby incorporated by reference: U.S. Pat. No. 5,862,321 (entitled: "System and Method for Accessing and Distributing Electronic Documents"); U.S. patent application Ser. No. 09/118,598 (entitled: "Context-Sensitive Document Transactions"); U.S. patent application Ser. No. 09/118,322 (entitled: "Token-Based Document Transaction"); U.S. patent application Ser. No. 09/118,221 (entitled: "Token-Based Document Transaction Systems"); U.S. patent application Ser. No. 09/270,641 (entitled "System For Generating Context-Sensitive Hierarchically Ordered Document Service Menus"); U.S. Pat. No. 6,397,261 (entitled "Secure Token-Based Document Server"); U.S. patent application Ser. No. 09/270,451 (entitled "Mobile Email Document Transaction Service"); and U.S. patent application Ser. No. 09/270,645 (entitled "Mobile Document Paging Service"). Further background information relating to network protocols is disclosed by Tanenbaum in "Computer Networks," ISBN 0-13-349945-6.

In accordance with the invention, the distributed operating environment 100 includes a token-enabler unit 105 and a non token-enabled device 107. The token-enabler unit 105 is a standalone device for communicating to the token-enabled mobile computing device 118 information that identifies document services available at the non token-enabled device 107. Advantageously, the standalone token-enabler unit 105 seamlessly integrates the non token-enabled device 107 into the token-enabled operating environment 100. That is, the token-enabler unit 105 makes available the services of the non token-enabled device 107 to other token-enabled devices without requiring hardware or software modifications to the non token-enabled device 107. In effect, the unit 105 token-enables the non token-enabled device 107 independent of the device itself, thereby simplifying the integration of non token-enabled devices in the token-enabled operating environment 100.

The context in which the token-enabler unit 105 is positioned relative to the non token-enabled device alerts a user that the token-enabled mobile computing device is effectively token-enabled. For example, the token-enabler unit 105 can be proximately located or fixedly attached to the non token-enabled device 107. In operation, the token-enabled device 105 communicates over an IR communication channel with the token-enabled mobile computing device 118 to provide information that identifies services available at (or performed by) the non token-enabled device 107 to which the token-enabled device 105 is proximately positioned or fixedly attached. Upon receipt of the information that identifies the services available at the non token-enabled device 107, the document services offered by the non token-enabled device 107 may then be readily accessed by the mobile computing device 118 within the distributed operating environment 100.

It will be appreciated by those skilled in the art that the non token-enable device 107 may be operatively coupled to network 116 as illustrated by dotted line 103 depending on the particular service provided by the device 107. For example, network printers are devices that are coupled to networks whereas standalone fax machines are not. In addition, it will be appreciated that in alternate embodiments the token-enabler unit 105 may communicate with the mobile computing device 118 over an RF communication channel.

B. Token-Enabled Server

The token-enabled server 126, which operates on the wire-based networks 116 and 122, communicates with network devices indicated by reference numbers 102, 104, 106, 108, 110, and 112, as well as, the RF and IR gateways 114 and 120. The token-enabled server 126 includes token-aware services or servers 134, 136, 138, 140, 142, and 144. These token-aware services can either operate centrally on token-enabled server 126 or individually on servers distributed over Intranet 116 or Internet 122. The services provided by the token-enabled server(s) 126 are shared between a plurality of users of the mobile computing devices.

Transmissions from the mobile computing device 118 are routed through one of the gateways 114 or 120 to transaction server 144. The transaction server 144 is adapted to manage transaction requests from a plurality of mobile computing devices that involve requests for document services available on networks 116 and 122. The directory 'server 142 maintains a database of token-enabled devices (e.g., printer 102 and scanner 110). The transaction server 144 communicates with the directory server 142 to look up parameters for satisfying document delivery requests from the mobile computing devices. For example, the directory server contains information that relates a particular IR transceiver 114 to its associated network device such as printer 102. In accordance with the invention, the directory server 142 contains information (e.g., a lookup table) that relates a particular token-enabler unit (e.g., unit 105) to its associated non token-enabled device (e.g., device 107).

In addition, the transaction server 144 communicates with the token-aware document delivery servers 138 and 128. The token-aware document delivery servers 138 and 128 accept document tokens and retrieve the document that a token represents. Document tokens reference documents stored on the token-aware shared document server 134, the token-aware personal document server 128, or other file servers located on the Intranet 116 and the Internet 122 (e.g., network file server 104). Effectively, any mobile computing device 118 can communicate either directly or indirectly with the token-aware document servers 134 and 128.

One purpose of the token-aware document servers 134 and 128 is to function as an interface between token-enabled devices and services and non token-enabled file servers. That is, the token-aware document servers 134 and 128 are used to access a document identified in a document token when that document is stored on a file server that is not token-enabled. Examples of file services that are not token-enabled include the Windows NT file service (a product of Microsoft Corporation) and the NFS (Network File System) file service.

A document token (also referred to herein as a document reference) is a superset of a Uniform Resource Locator (URL) because document tokens include security elements for authentication. Advantageously, document tokens may also reference documents on any standard web server operating on Intranet 116 or Internet 122. It will be appreciated by those skilled in the art, however, that a standard web server does not recognize secure token transactions, and therefore the standard web server disregards any security elements of tokens. An example of a token-aware document server which supports secure token transactions is disclosed in U.S. Pat. No. 6,397,261 (entitled "Secure Token-Based Document Server").

If necessary, the token-aware document delivery server 138 requests that the conversion server 136 convert retrieved documents into an appropriate format. The conversion server 136 converts documents between a number of different document formats such as Microsoft Word, Postscript, and bitmap formats. Interchanging documents between various different formats is known as disclosed, for example, in U.S. Pat. No. 5,210,824.

After retrieving and formatting a document referenced by a document token, the token-aware document delivery server 138 delivers the formatted document to a driver or interface for accessing one of the document processing devices located on Intranet 116 (e.g., printer 102 or personal workstation 108). The drivers or interfaces available on the token-aware document delivery server 138 include a filing interface 146, a fax driver 148, a print driver 150, an email interface 152, or a viewing driver 156. In an alternate embodiment (not shown), the token-enabled server 126 includes a document capture server, which stores and allows access to documents received from input devices such as scanner 110 and fax server 106.

The network gateways 114 and 120, the transaction server 144, the token-aware document delivery server 138, and the token-aware document servers 134 and 128 communicate with the certificate server 140 which stores a list of public keys of users. In requesting a public key from the certificate server 140, a requesting token-enabled server submits a hint of a user's public key. In return, the certificate server 140 supplies a certificate, which contains the user's public key as well as a well-known public key that can be used to authenticate the certificate. In addition, the certificate server 140 may support standard certificates such as the X509 certificates from Verisign Incorporated.

The difference between a token-aware shared document server 134 and a token-aware personal document server 128 is that the shared document server 134 is capable of authenticating requests to fetch documents identified in document tokens using many different key pairs. In contrast, the personal document server 128 may only authenticate requests with one or two key pairs, such as a device key from the mobile computing device 118 and the personal workstation 108. Accordingly, the shared document server 134, unlike the personal document server 128, is adapted to accommodate a number of users operating on Intranet 116.

C. Token Elements on Personal Workstations

Operating on personal workstation 108 are token-enabled personal workstation elements 131, which include a document token management service 132, a token-aware document viewing service 130, and a token-aware personal document server 128. Any combination of these elements may operate on one or more personal workstations 108. The token-aware personal document server 128 provides users operating a mobile computing device 118 with access to documents stored on the particular workstation operating on networks 116 or 122. The token-aware document viewing service 130 provides a user of mobile computing device 118 with the capability of beaming document tokens to the personal workstation 108 and viewing the documents referenced by the document tokens. The document token management service 132 provides a facility for creating document tokens for documents stored, for example, on personal workstation 108 or network file server 104.

D. Token-Enabled IR and RF Gateways To Token-Enabled Servers

The token-enabled server 126 offers a plurality of document services to a user of the mobile computing device 118 through either IR gateway 114 or RF gateway 120. When the gateway 114 receives a document transaction service request from a proximately located mobile computing device 118, the IR gateway 114 forwards the request to the transaction server 144 over Intranet 116. The IR gateway can either be embedded in or be intimately associated with a device that offers document services. For example, the printer 102 shown in FIG. 1 is intimately associated with an IR gateway 114.

Before forwarding the document service request, the IR gateway context insertion sliver 115 authenticates the request using the certificate server 140 and appends location context information to the request. The location context information allows the token-enabled server 144 to determine which gateway forwarded a particular request document service request. This permits the token-enabled operating environment to offer user context-sensitive services. Document service requests that arrive either from RF gateway 120 or Internet 122 are authenticated at firewall 124.

Forming part of the RF gateway 120 is a dialup server for establishing connections between wire-based and wireless networks. Typically, such a dialup server establishes PPP (Point-to-Point Protocol) connections with the mobile computing device 118 and thereby provides a communication link with the token-enabled server 126 operating on network 116.

In order to establish a connection through a particular IR gateway 114, the IR port of the mobile computing device must have an unobstructed path and be within one meter of the IR gateway 114. In one embodiment when making a document service request, a mobile computing device 118 attempts to access an IR gateway 114 before attempting to access the RF gateway 120. When a mobile computing device 118 is unable to establish an IR connection, the mobile computing device 118 attempts to establish an RF connection over RF gateway 120. Thus, a user must consciously position the mobile computing device 118 proximate to an IR gateway in order to establish an IR link; otherwise by default, an RF link is established unless instructed not to by the user of the mobile computing device. To provide feedback to the user, a message of the status of attempted or established IR or RF connections is presented on a user interface of the mobile computing device.

E. Token-Enabler Unit

Figure 2:
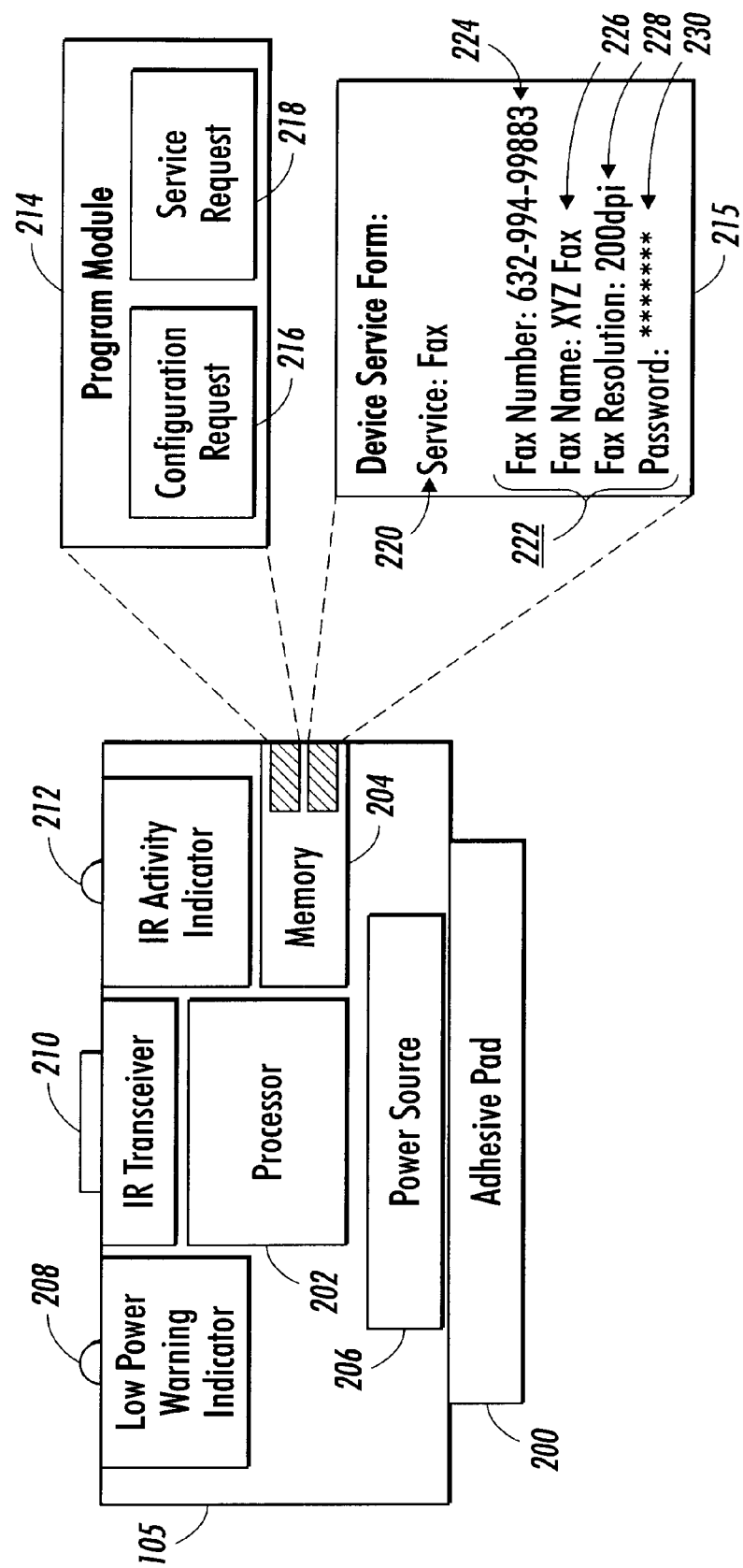
FIG. 2 illustrates a detailed block diagram of the standalone token-enabler unit shown in FIG. 1 for token-enabling the non token-enabled device.

FIG. 2 illustrates a detailed block diagram of the standalone token-enabler unit 105 shown in FIG. 1. The token-enabler unit 105 is operationally independent from but collocated with a non token-enabled device (e.g., device 107 in FIG. 1). Collocation of the token-enabler unit 105 with a non token-enabled device alerts a user of a mobile communication device that the non token-enabled device is token-enabled. In one embodiment, the token-enabler unit 105 is fixedly attached to a non token-enable device with an adhesive pad 200. In alternate embodiments, the token-enabler unit is fixedly attached using for example Velcro®, glue, tape or any other fastener or adhesive material.

In one embodiment, the token-enabler unit 105 includes a central processing unit 202 (i.e., processor), a memory 204 (e.g., ROM, RAM, EPROM, EEPROM, flash), a power source 206, a low power warning indicator light 208, an infrared (IR) transceiver 210, and an IR activity indicator light 212. In one embodiment; the processor 202 is a 12 MHz 8-bit micro-controller such as the Intel 87C524, or a derivative of the Intel 8051. The IR transceiver 210 is an IrDA compatible transceiver for communicating with the mobile communication device 118. The power source 206 of the unit 105 can be one, or a combination of two or more of the following: a battery, an external power supply, a photovolaic power supply, or any other suitable power supply.

In accordance with the invention, the memory 204 has stored therein a program module 214 and a device service form 215. The program module 214 includes instructions for responding to configuration requests 216 and service requests 218. The device service form 215 includes a programmable identification'service identifier 220 (i.e., service). Depending on type of service identifier 220 that is programmed (e.g., fax), the device service form 215 may include one or more programmable device parameters 222. For example, the programmable device parameters 222 of a fax machine include a fax number 224, a fax name 226 (or text message), a fax resolution 228, and a password 230 for restricting future programming.

In an alternate embodiment of the token-enabler unit 105, the processor 202 and memory 204 are integrated together on a single chip. In other alternate embodiments, the token-enabler unit 105 is similar in design to the active badge disclosed in R. Want, A. Hopper: "Active Badges and personal interactive computing objects" *IEEE Transactions on Consumer Electronics*, Vol. 38, No. 1 February 1992 pp. 10–20, and R. Want et al.,: "The Active Badge location system," *ACM Transactions on Information* Systems, Vol. 10, No. 1, January 1992, pp. 91–102.

F. Document Transaction Service Using A Token-Enabler Unit

F.1 Overview

Figure 3:
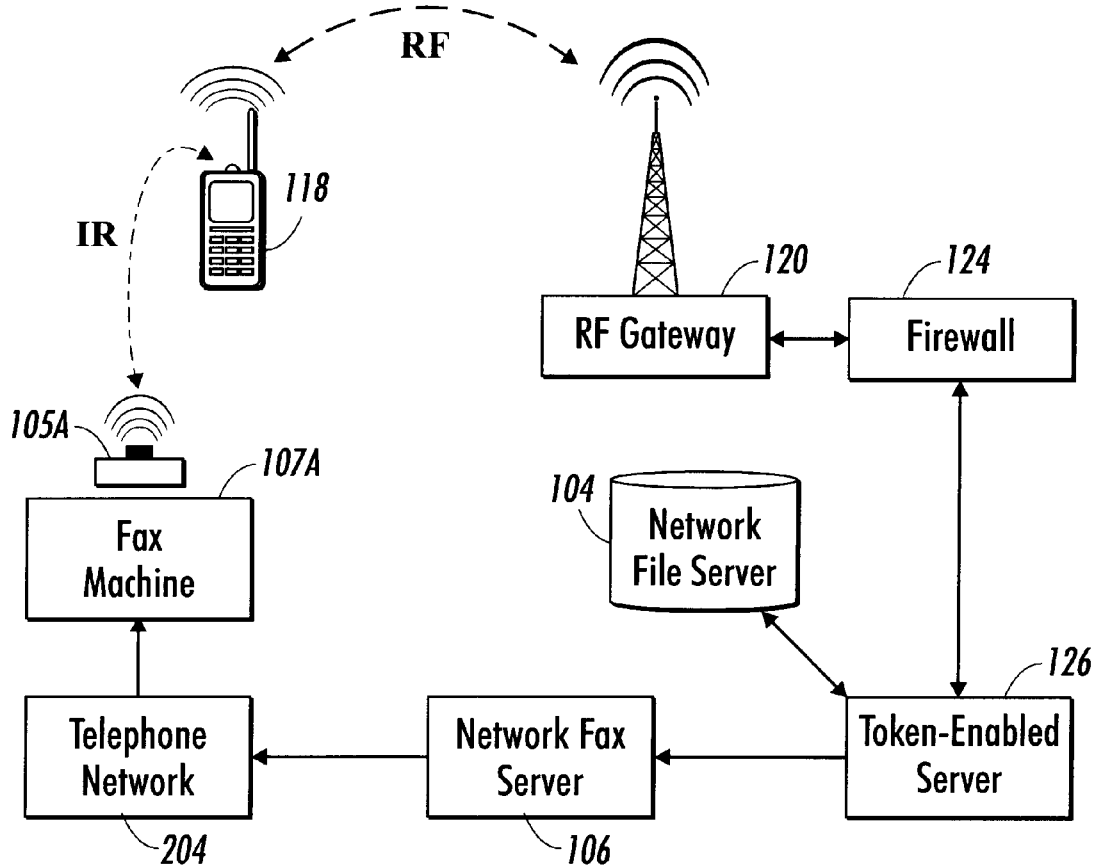
FIG. 3 illustrates the standalone token-enabler unit for, token-enabling a fax machine using the operating environment shown in FIG. 1.

FIG. 3 illustrates a block diagram of elements in the distributed token-enabled operating environment 100 shown in FIG. 1 for performing a document transaction using the token-enabled unit 105. In the detailed example illustrated in FIG. 3, the token-enabler unit 105a is proximately located or fixedly attached to a fax machine 107a. In accordance with the invention, the token-enabler unit 105a responds to configuration requests and to document service requests from mobile computing devices 118, which are set forth below in sections F.2 and F.3, respectively.

More specifically, document configuration requests are made by the mobile computing device 118 to customize the device service form 215 of the token-enabled unit 105a that is proximately located to the non token-enabled device 107a. Once the device service form 215 is configured, the token-enabler unit 105a is then prepared to respond to service request from mobile computing devices 118. Once document services information is received from the token-enabler unit 105a, the user of the mobile computing device 118 communicates with the token-enabled server 126 to request document services from the non token-enabled device 107a.

F.2 Configuration Requests

In accordance with the invention, the device service form 215 of the token-enabler unit 105a is configured with information that identifies a document service (e.g., a fax service) of a non token-enabled device (e.g., fax machine 107a). The configuration information in the device service form 215 is generally programmed once it is associated either fixedly or proximately with a non token-enabled device 107. In one embodiment, a mobile computing device 118 is adapted to program the device service form 215 of a token-enabler unit 105.

The following scenario is illustrative of the manner in which a token-enabler unit 105 is configured to identify a particular non token-enabled device. Initially, a person acquires a token-enabler unit to identify the document services available at a non token-enabled device such as a fax machine 107a. The person then attaches the token-enabler unit 105a to the non token-enabled fax machine 107a. Assuming the token-enabler unit 105a is appropriately powered, the person then employs a mobile computing device 118 to program the device service form 215 of the token-enabler unit 105a.

Figure 4:
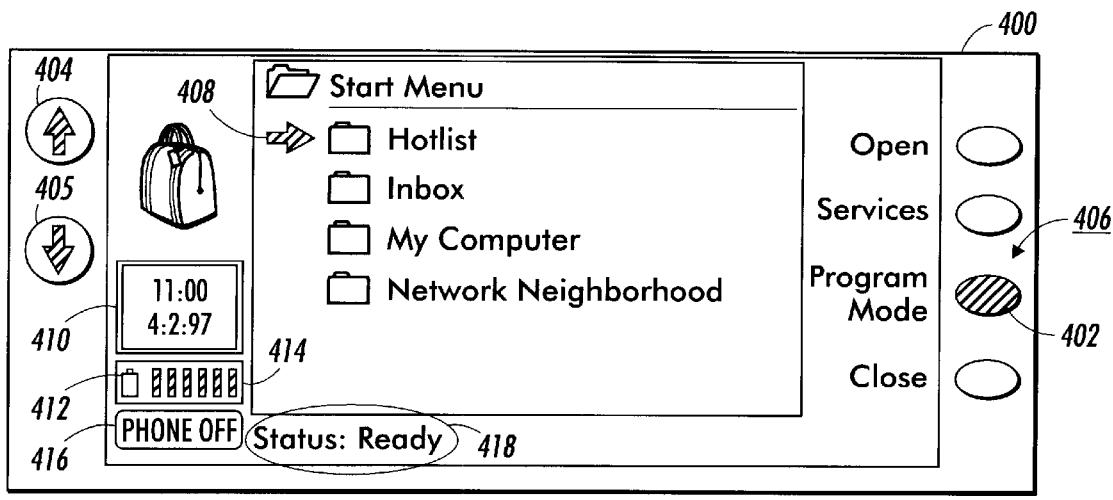
FIGS. 4–6 illustrate a user interface that operates on the mobile computing devices for configuring the token-enabler unit shown in FIG. 2.
Figure 5:
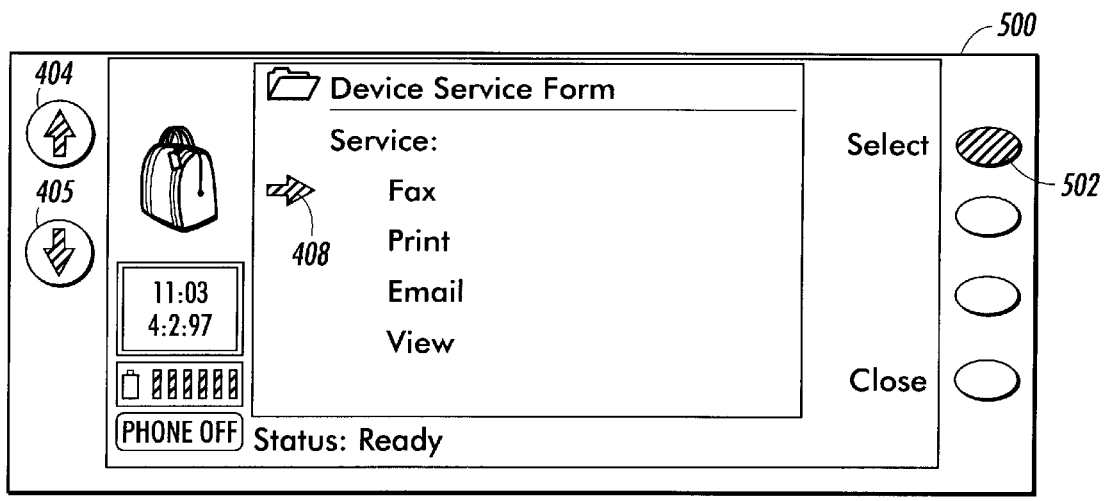
Figure 6:
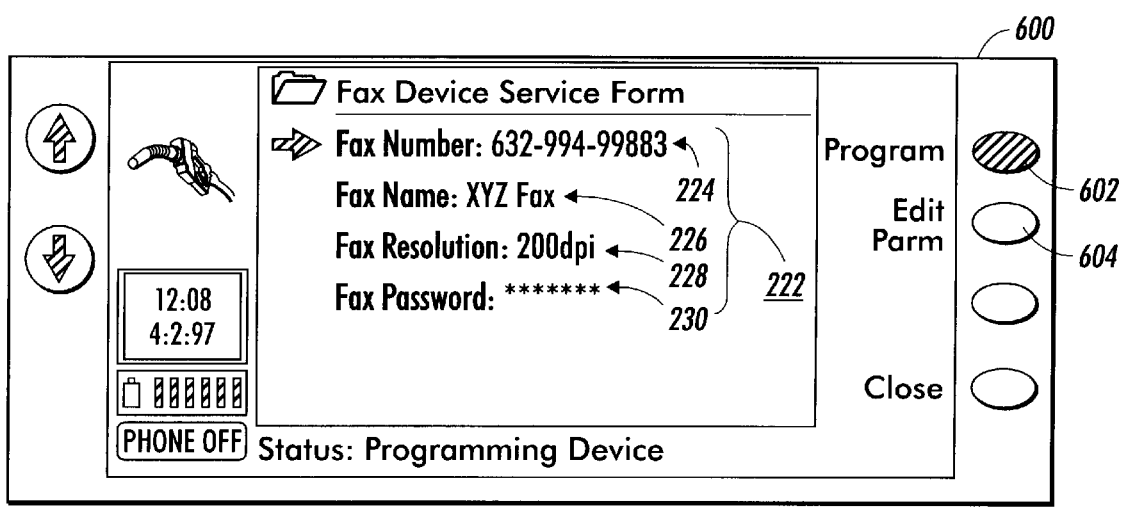

FIGS. 4–6 illustrate a user interface 400 operating on the mobile computing device 118 for configuring the device service form 215 on the token-enabler unit 105a. Generally, the user interface 400 operating on the mobile computing device 118 includes scroll buttons 404 and 405, command buttons 406, selection indicator 408, time and date indicator 410, battery power indicator 412, RF field strength indicator 414, RF status indicator 416, and operational status indicator 418.

To begin configuration of the token-enabler unit, the program mode button 402 is selected by the user as shown in FIG. 4. Once selected, a list of device services is identified to the user in the user interface display screen 500 shown in FIG. 5. Using the scroll buttons 404 and 405, a user identifies and selects the appropriate service using selector indicator 408 and command button 502. Once the appropriate service is selected, programmable device parameters 222 are programmed using "edit parm" button 604 shown on the display screen 600 in FIG. 6.

It will be appreciated by those skilled in the art that certain of the device parameters 222 need not be programmed for the device to operate properly. In addition, exactly which device parameters 222 are defined for a particular service and which of those require programming for proper operation of the token-enabler unit depend on the particular service and the particular non token-enable device to which the token-enabler unit is attached. Furthermore, it will be appreciated by those skilled in the art that some multifunctional devices offer more than one service (e.g., fax and print) and that the device service form 215 may be modified to readily accommodate multiple services.

Once the device parameters 222 for a particular device are programmed at the user interface 600 shown in FIG. 6, the program button 602 is pressed to open an IR communication channel with the token-enabler unit 105. Once a communication channel is opened with the token-enabler unit 105, the mobile computing device 118 encodes the service and device parameters in a format suitable for transmission over the IR communication channel to the token-enabler unit 105.

Upon receipt of the device parameters, the token-enabler unit 105 decodes and stores the service and device parameters in the memory 204, and subsequently acknowledges receipt of the service and device parameters to the mobile computing device 118. If the user chooses to password protect the programming of the token-enabler unit 105 by specifying password 230, any changes to the device parameters stored in memory 204 of the token-enabler unit 105 must be accompanied by a valid password. If no password is specified, the device parameters may be reprogrammed at anytime absent a password.

In another embodiment, the device parameters of the token-enabler unit 105 are initially input and stored at a central location in directory server 142 of the token enable server 126. The device parameters are then transmitted from the central location to the token-enabler unit through a mobile computing device 118 or another device adapted to communicate with the token-enabler unit. In yet another embodiment, authentication certificates are used in programming the device service form 215 to provide additional security when configuring a token-enabler unit.

F.3 Service Requests: Transaction Protocol and User Interface

Figure 7:
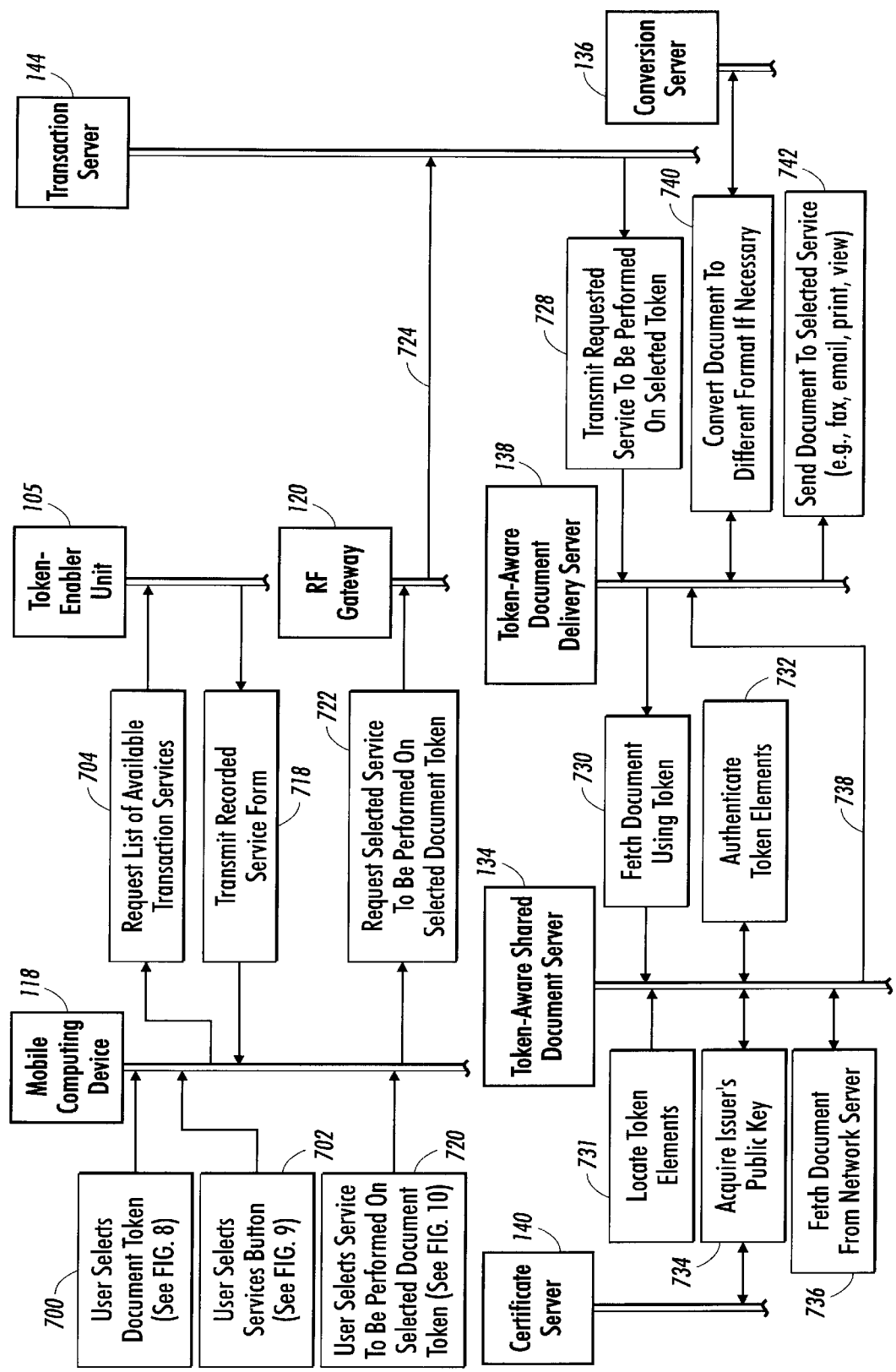
FIG. 7 illustrates a communication sequence for transmitting a document token from a mobile computing device to a non token-enabled device using the standalone token-enabler unit.

Referring again to FIG. 3, once the device service form 215 in the token-enabler unit 105a is configured, the token-enabler unit 105a is prepared to identify the document service available at the non token-enabled fax machine 107a to the mobile computing device 118. FIG. 7 illustrates an example of a transaction protocol for providing a token-to-fax service using the integrated wireless and wire-based communication service illustrated in FIG. 1.

More specifically, FIG. 7 illustrates the manner in which the mobile computing device 118 communicates over IR communication channel to receive document service information from token-enabler unit 105a and thereby request the document service from fax machine 105a (shown in FIG. 3). In operation, users of the mobile computing devices 118 access the token-to-fax transaction service to deliver a document referenced by a document token stored on a mobile computing device to specified fax recipients.

As set forth in FIG. 7, the token-to-fax transaction protocol, which provides the token-to-fax service, is invoked by a user of the mobile computing device 118 when a document token is selected, as indicated by action 700. The action 700 is performed, for example, on a user interface 400 of the mobile computing device 118 shown in FIG. 8. The user interface 800 is similar to the user interface shown in FIG. 4 except that the open command 802 is selected instead of the program mode command button 402 as shown in FIG. 4.

Figure 10:
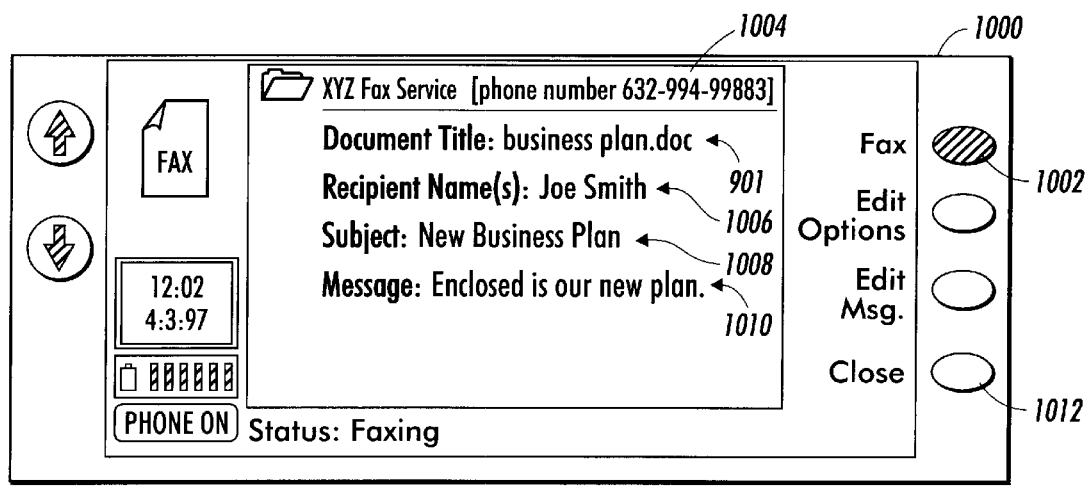

FIGS. 8–10 illustrate sequence of frames for a user interface operating on the mobile computing device 118 for performing user-specified operations 700, 702, and 720, set forth in FIG. 7. Initially at user action 700, the user selects a document token from a "Hotlist" folder 820, which is accessible from the start menu screen 818 shown in FIG. 8, using the scroll buttons 404 and 405 and selector indicator 408. Once a user selects a folder in start menu. 818, the contents of the folder are displayed by selecting the "open" command button 802.

In the example illustrated in FIG. 9, the contents of the "Hotlist" folder 904 are displayed in the display screen 900. Each document in the "Hotlist" folder is a document token (i.e., a reference to a document token). Storing document tokens advantageously minimizes the memory requirements of the mobile computing device 118, as well as, the bandwidth required for transmitting information from a mobile computing device to other mobile computing devices or other computing devices that are coupled to networks 116 or 122. An example of a document token is a document URL (Uniform Resource Locator) which consists of three fields: a protocol field, a field with the DNS (Domain Name System) name of a host system, and a file name field.

Although the information for displaying the contents is local to the mobile computing device, the mobile computing device may automatically or in response to a command re-sync its contents with the contents of the user's personal workstation 108. In one. embodiment, the content of the personal workstation of a user is mirrored on the display screen of the mobile computing device. Tokens may be implicitly (i.e., dynamically) constructed as a mobile computing device browses files and folders accessible via the token-aware document server 126. A mobile computing device implicitly constructs a token by assembling filename, host name, protocol, and security information about a document.

From the display screen 800 shown in FIG. 8, the user selects one of the document tokens shown on mobile computing device 118 using selector indicator 408 and scroll buttons 404 or 405. Once the user has identified a file 901, the user selects the "Services" button 902 as shown in FIG. 9. Responsive to the selecting the services button 902 for the identified document 901, mobile computing device 118 transmits a request for a list of available transaction services over an IR communication channel for that user at action 704, as shown in FIG. 7. Upon receipt of the request 704, the token-enabler unit 105 transmits to the mobile computing device 118 the parameters defining the device service form 215 at action 718.

Once information concerning an available service(s) (e.g., content from the device service form 215) is received at the mobile computing device 118, the service (e.g., "Fax Service") display screen 1004 is presented at the user interface 1000. The "Fax Service" display screen 1004 sets forth a field for the name 901 of the document token selected at screen 900 shown in FIG. 9. In addition; at action 720, a user is provided with fields on the user interface 1000 for filling in one or more recipient name(s) 1006, a subject field 1008, and a message 1010. In an alternate embodiment, when more than one service is presented, a "Services Directory" screen (not shown) is presented at the user interface to allow the user to select from more than one service.

Upon filling in some or all of the options shown on the display screen 1000, the user selects the "fax" command button 1002 shown in FIG. 10. Alternatively, the user can select the "close" command button 1012. The "close" command is used to exit from the token-to-fax service. Selecting the "fax" command button 1002 results in faxing to a recipient(s) specified at location 1006 the document identified by document token 901. Responsive to selection of the fax command button, mobile computing device 118 returns to the start menu display screen 818, which is shown in FIG. 8. A user of the mobile computing device 118 can retrieve progress of any document transaction service requested by opening a service request status log (not shown).

At action 722, the mobile computing device 118 transmits the request specified by the user in display screen 1004 (shown in FIG. 10) to transaction server 144 through RF gateway 120. Because the mobile computing device 118 is aware that the token-enabler unit 105 responded to the request for available services at action 704, the mobile computing device 118 transmits the request to RF gateway 120 without initially trying to transmit the request through an IR gateway 114. Once the RF gateway 120 receives a service request, it in turn transmits the service request to the transaction server 144 at action 724.

Subsequently at action 728, the transaction server 144 transmits the service request for performing the token-to-fax service on the selected document token 901 to the token-aware document delivery server 138. At action 730, the token-aware document delivery server 138 requests that the document identified by the selected document token 901 be fetched from a token-aware document server, which in this example is the token-aware shared document server 134.

Initially at action 731, the token-aware shared document server 134 locates elements of the token received from the token-aware document delivery server 138. The token elements that are located at action 731 include for example a document URL that identifies the name and location of a document. The token-aware shared document server 134 then authenticates document token at action 732. Part of the process of authenticating the document token is performing action 734 for acquiring the public key of the original user issuing the document token from certificate server 140. Details for authenticating elements of the token are described in U.S. Pat. No. 6,397,261 (entitled "Secure Token-Based Document Server"). Although not shown in FIG. 7, the authentication of a document token may be performed at network gateways 114 and 120, the transaction server 144, and the token-aware personal document server 128.

After authenticating the token, the token-aware shared document server 134 fetches the document from its physical location on the network file server 104 or the like, at action 736. The fetched document is then forwarded to the token-aware document delivery server 138 at action 738. If necessary, the token-aware document delivery server 138 performs action 740 to convert the document acquired from the token-aware shared document server 134 into a format specified either by the sender or the selected fax service using the conversion server 136.

Finally, to complete the actions performed by the token-enabled servers 126 in performing the token-to-fax transaction service, the document delivery server 138 sends the document acquired from the token-aware shared document server 134 to the specified fax recipient(s). The document, as well as, any subject data 1008 or message data 1010 specified by the sender is transmitted using the fax client 148 of the document delivery server 138 to the network fax server 106. The network fax server 106 then transmits over telephone network 304 to the non token-enabled fax machine 107*a* as shown in FIG. 3.

Figure 11:
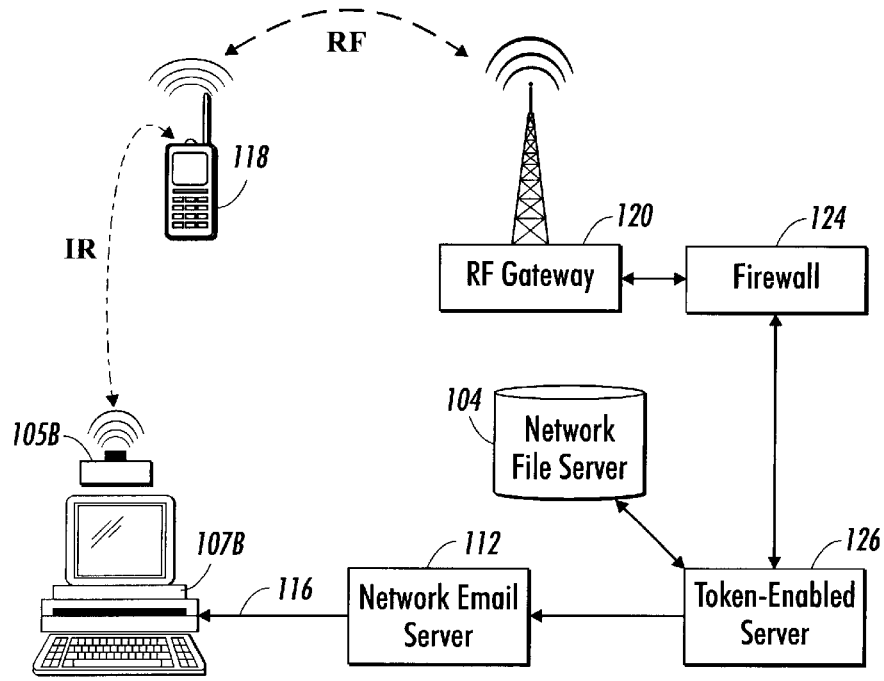
FIG. 11 illustrates the standalone token-enabler unit for token enabling an email client using the operating environment shown in FIG. 1.
Figure 12:
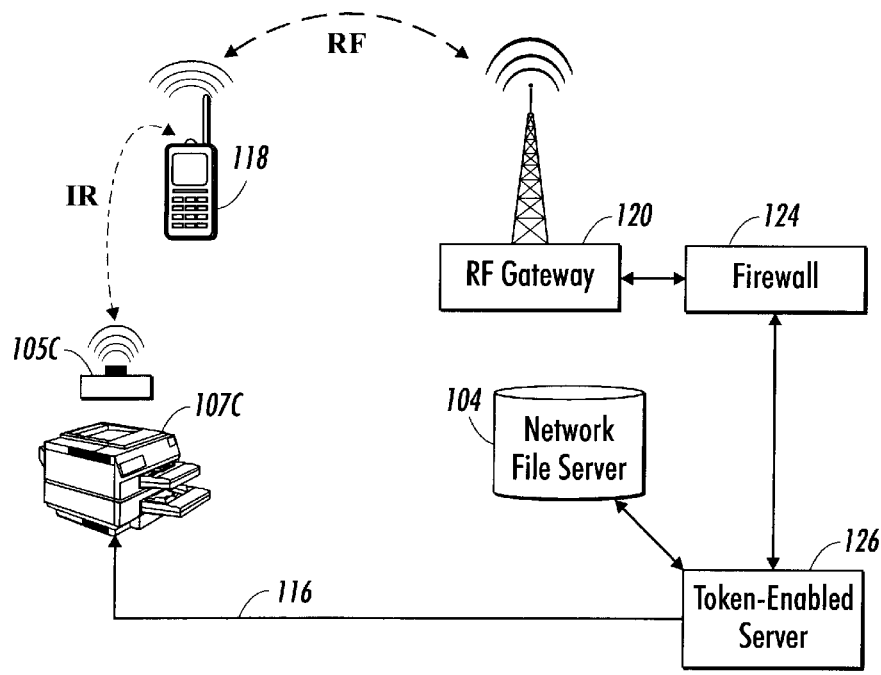
FIG. 12 illustrates the standalone token-enabler unit for token enabling a printer using the operating environment shown in FIG. 1.

FIGS. 11 and 12 illustrate two alternate embodiments for performing the present invention. FIG. 11 illustrates a token-enabler unit 105*b* that is used to identify non token-enabled mail client 107*b*. FIG. 12 illustrates a token-enabler unit 105*c* that is used to identify non token-enabled printer 107*c*. It will be appreciated by those skilled in the art that the transaction protocol set forth in FIG. 7 specifies one set of possible actions that can be performed by the token-enabled servers 126 to provide the token-to-fax transaction service or other transactions services such as token-to-email or token-to-print.

F.4 Configuration-Free Token-Enabler Units

In a further embodiment of the invention, no configuration at the token-enabler unit 105 is required before being ready to respond to service requests. In this alternate embodiment, the token-enabler unit 105 is pre-programmed with a unique identifier (e.g., URL). This unique identifier is fixed or hard-coded in a memory of the token-enabler unit 105 before being coupled to the non token-enabled device 107. In one instance, the unique identifier is programmed in the memory of the token-enabler unit 105 during manufacture.

Advantageously in this alternate embodiment, no configuration of a device service form at the token-enabler units is required. Instead, a database at a central server is programmed with parameters that identify the token-enabler unit collocated with the non token-enabler device. These programmable parameters for example include those for completing a device service form 215. More specifically in this alternate embodiment, service requests are responded to at step 718 shown in FIG. 7 by transmitting to the mobile computing device 118 a generic form that contains the unique identifier. Upon receipt of the unique identifier, the mobile computing device 118 communicates with the directory server 142 to retrieve a completed device service from 215.

In one implementation of configuration-free token-enabler units, the token-enabled unit 105 responds to requests for available transactions services (at step 704) from mobile computing devices 118 with a generic two-field service form (at step 718). The first field of the generic service form contains the URL of a target service form; the second field is filled by the mobile computing device with the user selected document token (at step 720) identifying the document on which the selected service is to be performed. The mobile computing device then submits the completed generic two-field service form to a token-enabled server capable of retrieving the referenced target service form, inserting the selected document token into the target service form, and invoking the service with the completed target service form.

G. Summary

To recapitulate, the present invention provides a token-enabler unit for seamlessly integrating non token-enabled devices (e.g., fax machines, printers, mail clients, scanners, viewers) in a distributed token-enabled operating environment. The distributed token-enabled operating environment consists of browsers, gateways, servers, and services that treat the Internet as a file system. The browsers are mobile computing devices that use references to documents (i.e., tokens) and invoke services on them. The token-enabler unit advantageously token-enables a non token-enabled device without requiring hardware or software modifications to the non token-enabled device. A further advantage of token-enabling a non token-enabled device is that the user of a mobile computing device is able to quickly access properties (e.g., fax phone number and a printer's network address) of non token-enabled devices.

In one embodiment of the invention, an ordinary off-the-shelf fax machine operates within the distributed token-enabled operating environment. In this embodiment, the user is no longer required to know the phone number of the non token-enabled fax machine. Instead, properties of the fax machine are automatically transmitted to the mobile computing device by a token-enabler unit attached to the fax machine over a communication channel (e.g., IR). Once communicated, the mobile computing device uses the parameters to access the distributed token-enabled operating environment and fax any document referenced by document tokens to the fax machine. Advantageously, the token-enabler unit automates the use of the non token-enabled fax machine in a token-enabled operating environment.

The invention has been described with reference to a particular embodiment. Modifications and alterations will occur to others upon reading and understanding this specification taken together with the drawings. The embodiments are but examples, and various alternatives, modifications, variations or improvements may be made by those skilled in the art from this teaching which are intended to be encompassed by the following claims.

What is claimed is:

1. In a distributed system for providing document services with a mobile computing device having a memory for storing document tokens that reference electronic documents stored on file servers accessible by a token-enabled server, an apparatus for providing access from the mobile computing device to a non token-enabled device adapted to provide document services for the electronic documents identified by the document tokens, said apparatus comprising:
   a token-enabler unit proximately located to the non token-enabled device for receiving and responding to queries from the mobile computing device requesting identification of document services available at the non token-enabled device;
      wherein the token-enabler unit establishes a communication channel with the mobile computing device for receiving the queries from the mobile computing device; the token-enabler unit responding to the queries by transmitting to the mobile computing device over the communication channel information for accessing through the token-enabled server document services available at the non token-enabled device; and
      wherein the token-enabler unit operates independent from a network forming part of the distributed system over which the mobile computing device, the token-enabled server, and the non token-enabled device communicate to deliver an electronic document identified by a document token stored on the mobile computing device to the non token-enabled device through the token-enabled server for having document services performed thereon.

2. The apparatus according to claim 1, wherein the token-enabler unit responds to queries from the mobile computing device by providing a list of document services available to the mobile computing device.

3. The apparatus according to claim 2, wherein the list of available services includes one of a fax service, a print service, and an email service.

4. The apparatus according to claim 2, wherein the token-enabler unit further comprises a program module for responding to configuration requests.

5. The apparatus according to claim 1, wherein the token-enabler unit responds to queries from the mobile computing device by providing a unique identifier for accessing at the token-enabled server the availability of document services at the non token-enabled device.

6. The apparatus according to claim 5, wherein the token-enabled server stores directory information for identifying with the unique identifier the document services available at the non token-enabled device.

7. The apparatus according to claim 1, wherein the token-enabler unit further comprises a transceiver.

8. The apparatus according to claim 7, wherein the transceiver further comprises an infrared transceiver.

9. The apparatus according to claim 7, wherein the token-enabler unit further comprises a memory for storing program instructions for responding to service requests.

10. The apparatus according to claim 9, wherein the memory of the token-enabler unit has stored therein instructions for responding to configuration requests.

11. The apparatus according to claim 1, wherein the token-enabler unit receives configuration requests from the mobile computing device.

12. The apparatus according to claim 1, wherein the token-enabler unit further comprises hardware communication means for responding to queries over the communication channel from the token-enabled device that request a list of available services offered by the non token-enabled device to which the token-enabler unit is proximately located.

13. The apparatus according to claim 1, wherein the token-enabler unit responds to queries for information with a telephone number.

14. The apparatus according to claim 1, wherein the token-enabler unit responds to queries for information by transmitting to the mobile computing device a telephone number of a non token-enabled facsimile machine.

15. The apparatus according to claim 1, wherein the token-enabler unit responds to queries for information by transmitting to the mobile computing device a network address of a non token-enabled printer.

16. The apparatus according to claim 1, the token-enabler unit further comprising an adhesive pad for attaching the token-enabler unit to the non token-enabled device.

17. The apparatus according to claim 1, the token-enabler unit, further comprising a battery power source.

18. The apparatus according to claim 1, wherein the token-enabler unit is configured by the token-enabled server.

19. In a distributed system for providing document services with a mobile computing device having a memory for storing document tokens that reference electronic documents stored on file servers accessible by a token-enabled server, an apparatus for providing access from the mobile computing device to a non token-enabled facsimile machine adapted to provide document services for the electronic documents identified by the document tokens, said apparatus comprising:
   a token-enabler unit proximately located to the non token-enabled facsimile machine for receiving and responding to queries from the mobile computing device requesting identification of document services available at the non token-enabled facsimile machine;

wherein the token-enabler unit establishes a communication channel with the mobile computing device for receiving the queries from the mobile computing device; the token-enabler unit responding to the queries by transmitting to the mobile computing device over the communication channel information for accessing through the token-enabled server document services available at the non token-enabled facsimile machine; and wherein the token-enabler unit operates independent from a network forming part of the distributed system over which the mobile computing device, the token-enabled server, and the non token-enabled facsimile machine communicate to deliver an electronic document identified by a document token stored on the mobile computing device to the non token-enabled facsimile machine through the token-enabled server.

20. In a distributed system for providing document services with a mobile computing device having a memory for storing document tokens that reference electronic documents stored on file servers accessible by a token-enabled server, an apparatus for providing access from the mobile computing device to a non token-enabled printer adapted to provide document services for the electronic documents identified by the document tokens, said apparatus comprising:

a token-enabler unit proximately located to the non token-enabled printer for receiving and responding to queries from the mobile computing device requesting identification of document services available at the non token-enabled printer;

wherein the token-enabler unit establishes a communication channel with the mobile computing device for receiving the queries from the mobile computing device; the token-enabler unit responding to the queries by transmitting to the mobile computing device over the communication channel information for accessing through the token-enabled server document services available at the non token-enabled printer;. and wherein the token-enabler unit operates independent from a network forming part of the distributed system over which the mobile computing device, the token-enabled server, and the non token-enabled printer communicate to deliver an electronic document identified by a document token stored on the mobile computing device to the non token-enabled printer through the token-enabled server for printing.

* * * * *